United States Patent
Chen et al.

(10) Patent No.: US 10,069,632 B2
(45) Date of Patent: Sep. 4, 2018

(54) REMOTE IMAGE SIGNING (71) Applicant: ARRIS Enterprises, Inc., Suwanee, GA (US)

(72) Inventors: Shi Jin Chen, Alpharetta, GA (US); Derek Alan Winters, Suwanee, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 424 days.

(21) Appl. No.: 14/481,852

(22) Filed: Sep. 9, 2014

(65) Prior Publication Data
US 2015/0071433 A1  Mar. 12, 2015

Related U.S. Application Data (60) Provisional application No. 61/875,426, filed on Sep. 9, 2013.

(51) Int. Cl.
*H04L 9/00* (2006.01)
*H04L 9/32* (2006.01)
*H04L 9/14* (2006.01)

(52) U.S. Cl.
CPC .............. *H04L 9/3247* (2013.01); *H04L 9/14* (2013.01); *H04L 2209/34* (2013.01)

(58) Field of Classification Search
CPC ...... H04L 9/3247; H04L 9/14; H04L 2209/34
USPC .......................................... 380/28, 277, 278
See application file for complete search history.

(56) References Cited

U.S. PATENT DOCUMENTS

| | | | | |
|---|---|---|---|---|
| 7,278,008 B1* | 10/2007 | Case | ................... | G06F 12/1036 710/26 |
| 7,933,410 B2* | 4/2011 | Fahrny | ............... | H04N 21/4623 380/201 |
| 8,185,741 B1* | 5/2012 | Agrawal | ............... | H04L 9/3247 713/176 |
| 2004/0056962 A1* | 3/2004 | Niimura | ............. | H04N 1/00928 348/207.99 |
| 2005/0028192 A1* | 2/2005 | Hooper | .................. | H04N 5/913 725/31 |
| 2005/0177726 A1* | 8/2005 | Alasia | ................... | G06T 1/0028 713/176 |
| 2005/0198680 A1* | 9/2005 | Baran | ............... | H04L 29/06027 725/88 |
| 2006/0112167 A1* | 5/2006 | Steele | ..................... | H04L 29/06 709/206 |
| 2006/0130107 A1* | 6/2006 | Gonder | ............. | H04L 29/06027 725/110 |
| 2006/0137015 A1* | 6/2006 | Fahrny | ............... | H04N 7/17318 726/26 |
| 2007/0016693 A1* | 1/2007 | Goodrich | ................ | G06F 9/445 709/247 |

(Continued)

Primary Examiner — Thu Ha Nguyen
(74) Attorney, Agent, or Firm — Bart Perkins (57) ABSTRACT

Methods, systems, and computer readable media can be operable to facilitate the remote signing of images created at a signing client. An image can be output from a signing client to a remote signing server, and the signing server can identify, from information carried by the image, one or more signatures needed by the image and/or encoding algorithm(s) to be applied to the image. The signing server can encode the image using the requested encoding algorithm(s) and/or can add requested signature(s) to the image, and the signing server can output the signed image to one or more designated targets.

17 Claims, 5 Drawing Sheets

(56) References Cited

U.S. PATENT DOCUMENTS

| | | | | |
|---|---|---|---|---|
| 2007/0067679 A1* | 3/2007 | Deobald | ............... | G06F 9/4406 |
| | | | | 714/36 |
| 2008/0098212 A1* | 4/2008 | Helms | ................ | H04L 63/0428 |
| | | | | 713/155 |
| 2008/0235746 A1* | 9/2008 | Peters | ................ | H04N 7/17318 |
| | | | | 725/111 |
| 2008/0307513 A1* | 12/2008 | Chow | ................... | H04L 12/581 |
| | | | | 726/5 |
| 2010/0131969 A1* | 5/2010 | Tidwell | ................. | H04H 60/31 |
| | | | | 725/14 |

* cited by examiner

REMOTE IMAGE SIGNING

CROSS REFERENCE TO RELATED APPLICATION

This application is a non-provisional application claiming the benefit of U.S. Provisional Application Ser. No. 61/875,426, entitled "Image Signing," which was filed on Sep. 9, 2013, and is incorporated herein by reference in its entirety.

TECHNICAL FIELD

This disclosure relates to signing images remotely.

BACKGROUND

As multiple-system operators (MSO) migrate to the use of shared frameworks for operating and servicing customer premise equipment (CPE) devices, such as the reference design kit (RDK) development model, a need develops for securing contributions made to the shared frameworks by MSOs. For example, MSOs can create their own images for use on associated CPE devices. Today's DOCSIS hardware requires images to be signed so they can be validated by hardware at runtime for a trusted boot-up process. They also need to be signed to allow for secure download in the field. Both of these processes have been put in place to reduce the possibility of a hacker being able to replace software on a device in the field. Generally, when an MSO generates an image on its own server, the image needs to be provided with a signature before it can be used or processed by a serviced device such as a CPE device or other client device. An MSO might not have access to a key or encoding algorithm that is needed to generate a signature for a specific receiving device. Therefore, a need exists for improving methods and systems for signing images remotely.

BRIEF DESCRIPTION OF THE DRAWINGS

Like reference numbers and designations in the various drawings indicate like elements.

DETAILED DESCRIPTION

It is desirable to improve upon methods and systems for signing images. Methods, systems, and computer readable media are described herein for facilitating the remote signing of images. For example, when an MSO creates an image that is to be used at a receiving device (e.g., CPE device, client device, server, etc.), the image typically must be signed, or verified, by applying a signature to the image and/or encoding the image according to a certain encoding algorithm. In embodiments, an image created for use at a receiving device can be output to a remote signing server, and the signing server can provide signature(s) and/or encode the image such that the image can be used by the receiving device. Signed images can be pushed to an image managing device (e.g., signing client device), a receiving device for which the image has been signed, or a publishing server from which a receiving device can request new and/or updated signed images.

Methods, systems, and computer readable media can be operable to facilitate the remote signing of images created at a signing client. An image can be output from a signing client to a remote signing server, and the signing server can identify, from information carried by the image, one or more signatures needed by the image and/or encoding algorithm(s) to be applied to the image. The signing server can encode the image using the requested encoding algorithm(s) and/or can add requested signature(s) to the image, and the signing server can output the signed image to one or more designated targets.

Figure 1:
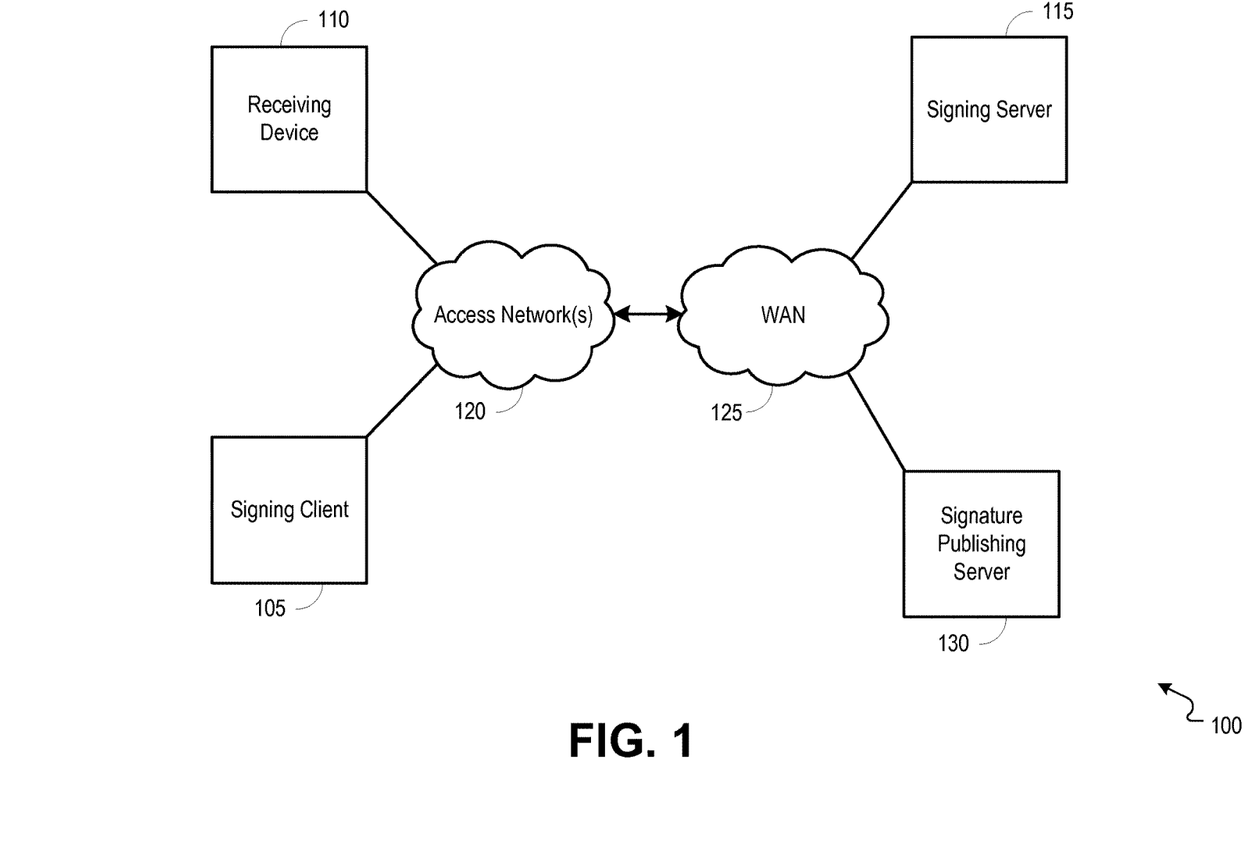
FIG. 1 is a block diagram illustrating an example network environment operable to facilitate remote image signing.

FIG. 1 is a block diagram illustrating an example network environment 100 operable to facilitate remote image signing. In embodiments, a signing client 105 can receive an image that requires signing prior to delivery of the image to a receiving device 110. A receiving device 110 may include a customer premise equipment (CPE) device (e.g., set-top box, gateway, modem, etc.), a client device (e.g., tablet, computer, mobile device, etc.), a server (e.g., transcoding server), or any other device operable to receive and process the image. A receiving device 110 may require that a received image be verified through a specified encoding algorithm before the receiving device 110 can use the received image. A signing client 105 may include a device that is used to create an image or to secure one or more signatures for a received image. For example, a signing client 105 can be used by an entity (e.g., MSO) managing the receiving device 110 to secure validating signatures for images created by the entity and that are to be used at the receiving device 110.

In embodiments, when a signing client 105 receives an image, the signing client 105 can determine one or more signatures needed for the received image, generate and add a signature request block header and/or signature request file header to the image, and output the image to a signing server 115. An image received by the signing client 105 may be a single image or a monolithic image (e.g., an image comprising a plurality of sub-images). The signing client 105 may identify one or more types of receiving devices 110 that the received image is to be used at, and the signing client 105 may determine one or more signatures that are required by the identified types of receiving devices 110. For example, different receiving devices 110 may need different validation signatures and/or use different encoding algorithms for processing and loading images, and the signing client 105 can consult a table associating different receiving device 110 types with various signatures and/or encoding algorithms to determine the one or more signatures that are needed for a received image.

When the image received at the signing client 105 is a single image, the signing client 105 can generate and add a signature request block header to the single image. In embodiments, the signature request block header may include receiving device identification information (e.g., an identification of a type of receiving device for which signatures are being obtained such as a device serial number or product number), signatures being requested for the image (e.g., trusted boot signature, secure download signature, etc.), encoding algorithms to be used on the image, and/or delivery information identifying one or more destinations (e.g., signing client 105, receiving device(s) 110, signature publishing server 120, etc.) for delivery of the signed image. The signature request block header may also include a space for a signature to be added.

When the image received at the signing client 105 is a monolithic image, the signing client 105 can generate and add a signature request block header to each of the sub-images and/or generate and add a signature request file header to the monolithic image. In embodiments, a signature request file header may include receiving device identification information, signatures being requested for the monolithic image as a whole or signatures being requested for each of the sub-images, encoding algorithms to be applied to the monolithic image, information identifying the number and length of sub-images, and/or delivery information identifying one or more destinations for delivery of the signed image. The signature request file header may also include a space for a signature to be added. Individual sub-images of a monolithic image may or may not need signing, and a signature request file header can designate what services or signatures are needed for each sub-image.

In embodiments, the signing client 105 can output an image to a signing server 115 through an access network 120 and a wide-area network 125. The access network 120 may include any of a variety of communication links between the signing client 105 and a WAN 125, such as a hybrid-fiber coaxial (HFC) network, phone line(s) connected to a digital subscriber line access multiplexer (DSLAM), wireless communication network, and others.

In embodiments, when the signing server 115 receives an image, the signing server 115 determines signature(s) and/or encoding algorithm(s) with which to encode the image, signs and/or encodes the image according to the signature request block header and/or file header, and can output the signed image to a designated target. Based upon information carried within a signature request block header and/or signature request file header, the signing server 115 can determine a unique identifier associated with the type of device for which the image is to be signed, one or more signatures to be applied to the image, a key and/or encoding algorithm(s) to be applied to the image, and/or one or more target output destinations.

The signing server 115 may remove the signature request block header(s) and/or file header and encode the received image according to an encoding algorithm identified within the signature request block header(s) and/or file header. For example, the signing server 115 can access a key associated with an identified encoding algorithm and can encode the image according to the key. A key and encoding algorithm can be identified by the signing server 115 based on an identification of the type of receiving device 110 for which the image is being signed. For example, the signing server 115 can have access to table including types of receiving devices (e.g., identified by unique identifiers such as serial numbers or product model numbers) associated with keys and/or encoding algorithms. The signing server 115 may generate a signed block header for each image or sub-image and/or a signed file header for a monolithic image. In embodiments, the signed block header and/or signed file header may include one or more requested signatures and/or an identification of the type of receiving device 110 for which the image has been signed.

In embodiments, the signing server 115 can output a signed image to an identified target destination. For example, the signed image can be output to the signing client 105, one or more receiving devices 110, and/or a signature publishing server 130. A receiving device 110 may request a signed image from the signature publishing server 130. For example, the signature publishing server 130 may store images that have been signed according to signatures needed by certain types of receiving devices 110. When a receiving device 110 requests a signed image, the signature publishing server 130 can identify a signed image associated with the requesting receiving device 110 and output the signed image to the receiving device 110. In embodiments, the signature publishing server 130 can periodically push signed images to associated receiving devices 110 when a new or updated image is received at the signature publishing server 130.

Figure 2:
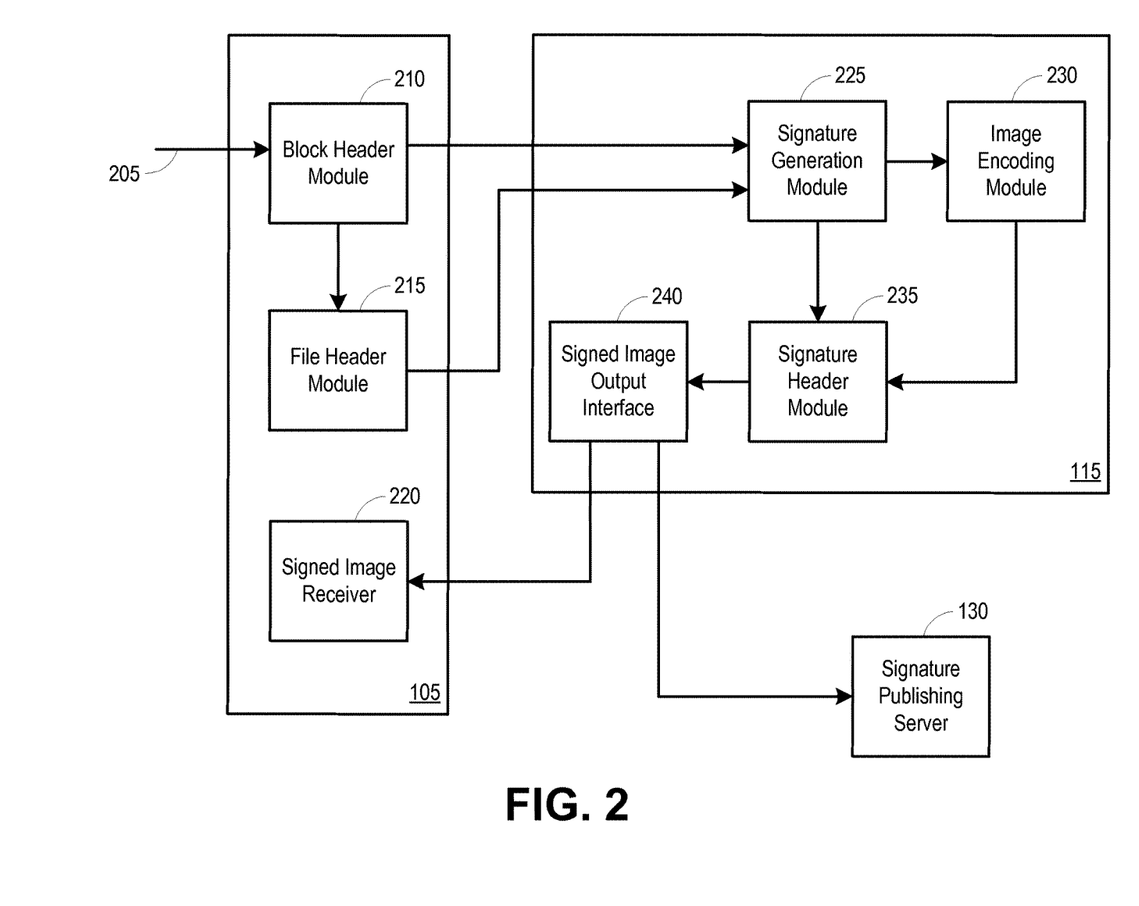
FIG. 2 is a block diagram illustrating an example signing client operable to generate and output a request for a signed image, and a signing server operable to sign an image according to the request.

FIG. 2 is a block diagram illustrating an example signing client 105 operable to generate and output a request for a signed image, and a signing server 115 operable to sign an image according to the request. The signing client 105 and signing server 115 can communicate with each other over a secure connection. For example, a secure connection may include a virtual private network (VPN), secured physical connection, or any other connection utilizing dedicated connections, and/or traffic encryptions.

In embodiments, an image 205 can be received at a signing client 105. The signing client 105 can be a device used by an entity, such as an MSO, to generate and/or process images to be used at one or more devices associated with the entity. The signing client 105 may include a block header module 210, a file header module 215 and a signed image receiver 220.

An image 205 can be received at a signing client 105 by a block header module 210. The received image 205 may be a single image or a monolithic image. In embodiments, the block header module 210 may determine whether to generate and add a signature request block header to the received image or each of a plurality of sub-images. If the received image is a single image, the block header module 210 can add a signature request block header to the single image and can output the single image to a signing server 115. If the received image is a monolithic image, the block header module 210 can add a signature request block header to each of the plurality of sub-images and output the plurality of sub-images to a signing server 115, add a signature request block header to each of the plurality of sub-images and forward the plurality of sub-images to the file header module, or forward the plurality of sub-images to the file header module 215 without adding signature request block headers to the sub-images. The file header module can generate and add a signature request file header to a monolithic image or group of sub-images and output the image to a signing server 115.

An image and corresponding signature request can be received by a signing server 115. The signing server 115 may include a signature generation module 225, an image encoding module 230, a signature header module 235, and a signed image output interface 240. In embodiments, an image and corresponding signature request can be received at a signing server 115 by a signature generation module 225. Based upon signature request block header(s) and/or a signature request file header associated with the received image, the signature generation module 225 may identify a type of receiving device for which an image signature is requested, determine one or more signatures to apply to the received image, determine one or more encoding algorithms to apply to the image, and determine one or more target destinations for the signed image. For example, the signature generation module 225 may access a table including a list of types of receiving devices associated with keys and/or encoding algorithms. The signature generation module 225 can identify, within the table, the receiving device associated with the signature request, and can identify a corresponding key and/or encoding algorithm.

In embodiments, the signature generation module 225 can forward information identifying the type of receiving device for which the image is being signed, information identifying the one or more signatures applied to the image, and information identifying target destination(s) for the signed image to the signature header module 235. The signature generation module 225 can then remove the signature request block header(s) and/or signature request file header from the received image, and can forward the raw image to the image encoding module 230.

In embodiments, the image encoding module 230 can encode the raw image according to one or more encoding algorithms identified by the signature generation module 225 from signature request block header(s) and/or a signature request file header associated with the image. The image encoding module 230 may have access to various keys associated with various encoding algorithms. For example, the image encoding module 230 can identify one or more keys associated with the one or more designated encoding algorithms from a table. The image encoding module 230 can encode the raw image and forward the encoded image to the signature header module 235.

In embodiments, the signature header module 235 can generate and add a signed header to the encoded image. The signature header module 235 may generate a signed header based upon information received from the signature generation module 225. For example, the signature header module 235 can generate a signed header that includes one or more requested signatures, an identification of the type of device (e.g., receiving device 110 of FIG. 1) for which the image has been signed, and/or identification of one or more targeted destinations. The image along with the signed header can be output, for example, by the signed image output interface 240 to the one or more targeted destinations. For example, the signed image can be output to the signing client 105 (e.g., received at the signed image receiver 220), the signature publishing server 130, or any other target destination associated with the signed image.

Figure 3:
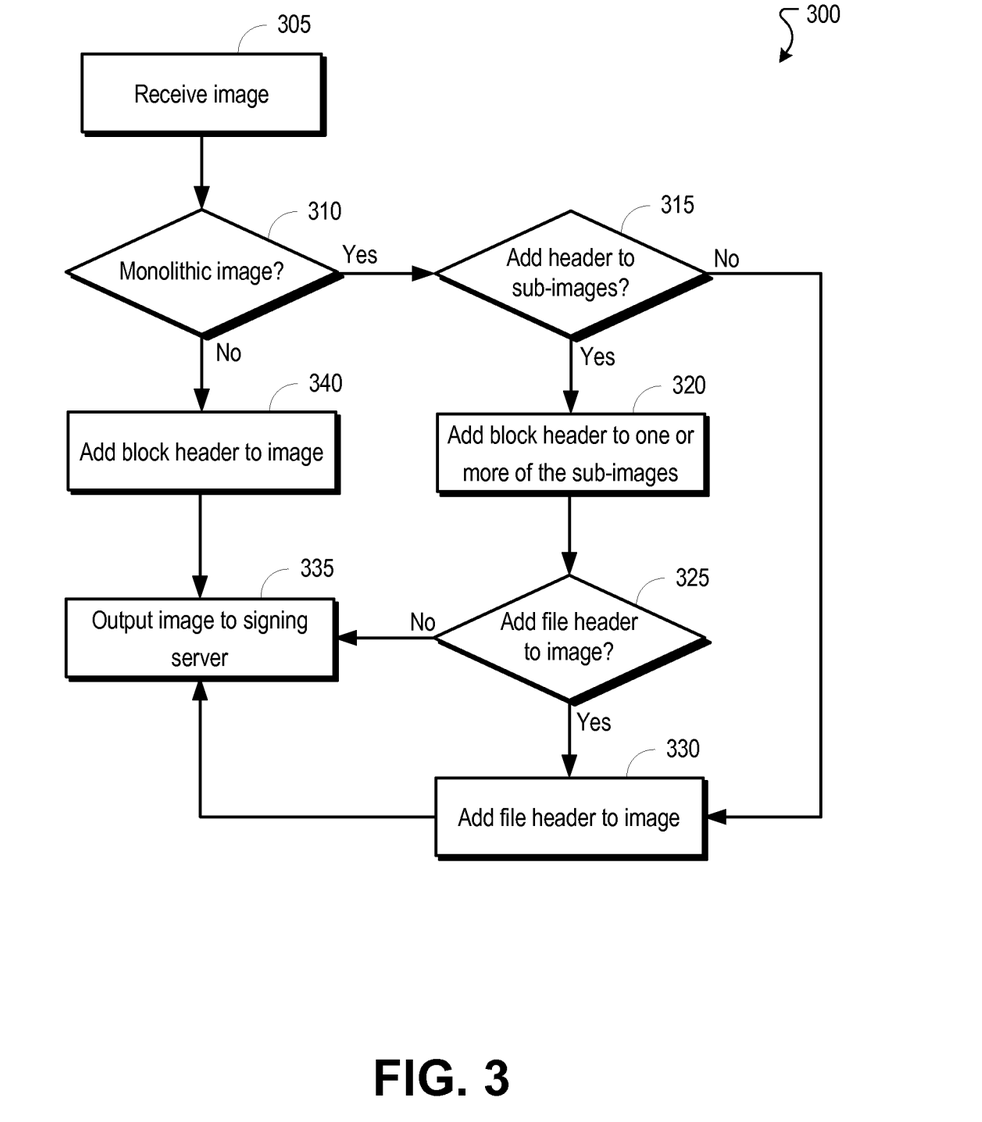
FIG. 3 is a flowchart illustrating an example process operable to facilitate the generation of an image signature request.

FIG. 3 is a flowchart illustrating an example process 300 operable to facilitate the generation of an image signature request. The process 300 can begin at 305 when an image is received at a signing client 105 of FIG. 1. The received image can be a single image or can be a monolithic (e.g., an image including a plurality of sub-images).

At 310, a determination can be made whether the received image is a monolithic image. The determination whether the received image is a monolithic image can be made, for example, by the block header module 210 of FIG. 2. If the received image includes a plurality of sub-images, the determination can be made that the received image is a monolithic image, and the process 300 can proceed to 315.

At 315, a determination can be made whether to add a signature request block header to one or more of the sub-images. The determination whether to add a signature request block header to one or more of the sub-images can be made, for example, by the block header module 210 of FIG. 2. In embodiments, the determination whether to add a signature request block header to individual sub-images may be based upon a configuration of the signing client 105 established by a controlling entity (e.g., MSO). If the determination is made to add a signature request block header to one or more of the sub-images, the process 300 can proceed to 320.

At 320, signature request block headers can be added to one or more of the sub-images. Signature request block headers can be added to sub-image(s), for example, by the block header module 210 of FIG. 2. In embodiments, a signature request block header may include receiving device identification information (e.g., an identification of a type of receiving device that signatures are being obtained for), signatures being requested for the image (e.g., trusted boot signature, secure download signature, etc.), encoding algorithms to be used on the image, and/or delivery information identifying one or more destinations (e.g., signing client 105, receiving device(s) 110, signature publishing server 120, etc.) for delivery of the signed image. A signature request block header may also include a space for a signature to be added.

At 325, a determination can be made whether to add a signature request file header to the monolithic image. The determination whether to add a signature request file header to the monolithic image can be made, for example, by the block header module 210 of FIG. 2. In embodiments, the determination whether to add a signature request file header to the monolithic image may be based upon a configuration of the signing client 105 established by a controlling entity (e.g., MSO). If the determination is made to add a signature request file header to the monolithic image, the process 300 can proceed to 330. If the determination is made not to add a signature request file header to the monolithic image, the monolithic image can be output at 335 to a signing server (e.g., signing server 115 of FIG. 1).

At 330, a signature request file header can be added to the monolithic image. The signature request file header can be added to the monolithic image, for example, by the file header module 215 of FIG. 2. In embodiments, the signature request file header may include receiving device identification information, signatures being requested for the monolithic image as a whole or signatures being requested for each of the sub-images, encoding algorithms to be used on the monolithic image, information identifying the number and length of sub-images, and/or delivery information identifying one or more destinations for delivery of the signed image. The signature request file header may also include a space for one or more signatures to be added. Individual sub-images of a monolithic image may or may not need signing, and a signature request file header can designate what services or signatures are needed for each sub-image. The monolithic image, along with the signature request file header can be output at 335 to a signing server (e.g., signing server 115 of FIG. 1).

Returning to 315, if the determination is made not to add signature request block headers to one or more sub-images, the process 300 can proceed to 330 where a signature request file header may be added to the monolithic image. The signature request file header can request signature(s) and/or encoding algorithms for the monolithic image as a whole or for one or more of the individual sub-images making up the monolithic image.

Returning to 310, if the received image is not a monolithic image, but is rather a single image, the process 300 can proceed to 340. At 340, a signature request block header can be added to the single image. A signature request block header can be added to the single image, for example, by the block header module 210 of FIG. 2. The image, along with the signature request block header can be output at 335 to a signing server (e.g., signing server 115 of FIG. 1).

Figure 4:
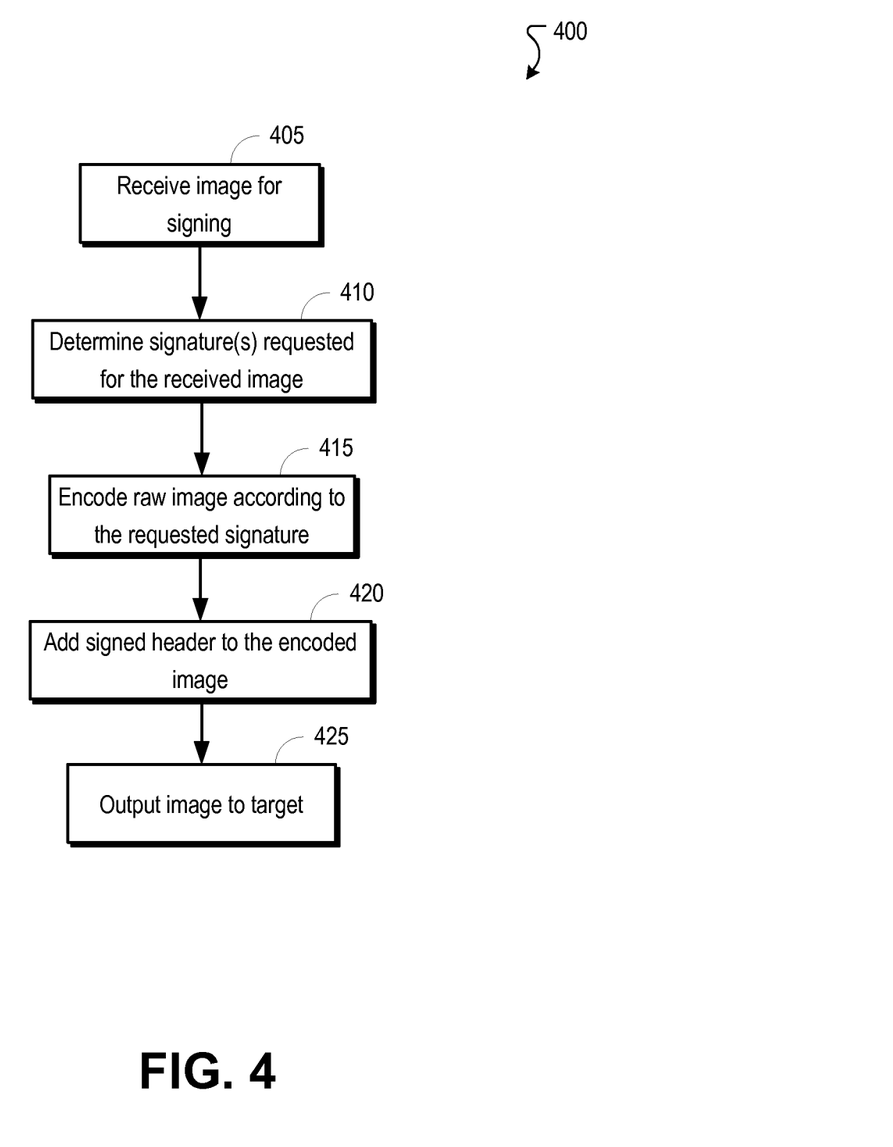
FIG. 4 is a flowchart illustrating an example process operable to facilitate the signing of a received image.

FIG. 4 is a flowchart illustrating an example process 400 operable to facilitate the signing of a received image. The process 400 can begin at 405 when an image to be signed is received at a signing server 115 of FIG. 1 from a signing client 105 of FIG. 1. The image can be received from the signing client 105 over a secure connection between the signing client 105 and signing server 115. In embodiments, the received image may include one or more signature request block headers and/or a signature request file header.

At 410, one or more signatures requested by the received image can be determined. The one or more requested signatures can be determined, for example, by the signature generation module 225 of FIG. 2. Based upon signature request block header(s) and/or a signature request file header associated with the received image, the signature generation module 225 may determine one or more signatures (e.g., trusted boot signing, secure download signing, etc.) to apply to the received image and/or determine one or more encoding algorithms to apply to the image. For example, a signature request block header can identify signature(s) and/or encoding algorithm(s) to be applied to a corresponding single image or sub-image, and a signature request file header can identify signature(s) and/or encoding algorithm(s) to be applied to one or more sub-images associated with a monolithic image. In embodiments, based upon a received header, the signature generation module 225 can identify the type of receiving device 110 of FIG. 1 for which the signature is requested, and access a table to identify a key and/or encoding algorithm associated with the identified receiving device 110. The signature generation module 225 can then remove the signature request block header(s) and/or signature request file header from the received image.

At 415, the raw image (e.g., the received image without signature request block header(s) or file header) can be encoded. The raw image can be encoded, for example, by the image encoding module 230 of FIG. 2. In embodiments, the image encoding module 230 can encode the raw image according to one or more encoding algorithms identified by a signature request block header and/or a signature request file header associated with the image. The image encoding module 230 may have access to various keys associated with various encoding algorithms. For example, the image encoding module 230 can identify one or more keys associated with the one or more designated encoding algorithms from a table, and can encode the raw image using the one or more identified keys.

At 420, a signed header can be added to the encoded image. A signed header can be added to the encoded image, for example, by the signature header module 235 of FIG. 2. The signed header can be a block header added to a single image or one or more of a plurality of sub-images, or the signed header can be a file header added to a monolithic image. The signature header module 235 may generate a signed header based upon information received from signature request block header(s) and/or file header associated with the received image. For example, a signed header may include one or more requested signatures, an identification of the type of device (e.g., receiving device 110 of FIG. 1) for which the image has been signed, and/or identification of one or more targeted destinations.

At 425, the image can be output. The image along with the signed header can be output, for example, by the signed image output interface 240 of FIG. 2 to one or more targeted destinations. For example, the signed image can be output to the signing client 105 of FIG. 1, the signature publishing server 130 of FIG. 1, or any other target destination associated with the signed image.

Figure 5:
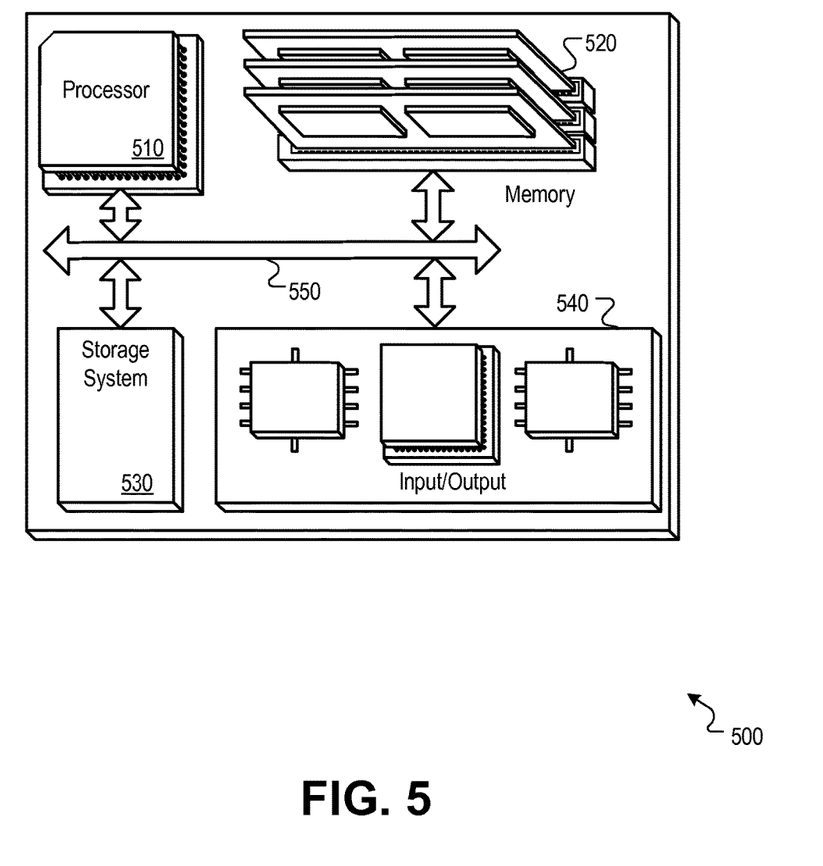
FIG. 5 is a block diagram of a hardware configuration operable to facilitate remote image signing.

FIG. 5 is a block diagram of a hardware configuration 500 operable to facilitate remote image signing. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In embodiments, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device (e.g, television, computer, tablet, mobile device, etc.) and/or a CPE device (e.g., CPE device(s) 110 of FIG. 1). In embodiments, the input/output device can include driver devices configured to send communications to, and receive communications from one or more networks (e.g., access network(s) 120 of FIG. 1, WAN 125 of FIG. 1, etc.).

Those skilled in the art will appreciate that the invention improves upon methods and systems for signing images. The methods, systems, and computer readable media described in this disclosure enable the remote signing of images created at a signing client. For example, an image that is created by an MSO and that is to be used by a receiving device can be output from a signing client to a remote signing server. The signing server can identify, from information carried by the image, one or more signatures needed by the image and/or encoding algorithm(s) to be applied to the image. The signing server can encode the image using the requested encoding algorithm(s) and/or can add requested signature(s) to the image, and the signing server can output the signed image to one or more designated targets.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   receiving, at a signing server, an image from a signing client, wherein the image comprises a first header that is generated by the signing client, wherein the first header comprises an identification of one or more receiving devices and an identification of one or more signatures and one or more encoding algorithms associated with each respective one receiving device of the one or more receiving devices, wherein the one or more signatures and one or more encoding algorithms comprise one or more signatures and one or more encoding algorithms that are required for processing the image by a device type that is associated with each respective one receiving device of the one or more receiving devices, wherein the signing client determines a device type that is associated with each respective one receiving device based upon the identification of the respective one receiving device, and wherein the one or more signatures and one or more encoding algorithms associated with each respective one receiving device of the one or more receiving devices are determined by the signing client based upon an entry within a table that comprises an association between the device type associated with the respective one receiving device and the one or more signatures and one or more encoding algorithms associated with each respective one receiving device;
   for each respective one of the one or more receiving devices, and based on the information within the first header:
      determining, at the signing server, a key and encoding algorithm associated with the respective one receiving device;
      retrieving the one or more signatures identified within the first header;
      removing the first header from the received image;
      encoding the received image according to the key and encoding algorithm;
      adding a second header to the image, wherein the second header comprises the one or more signatures; and
      outputting the image comprising the second header to the receiving device.

2. The method of claim 1, wherein the one or more identified signatures comprise one or more signatures required by the receiving device before the receiving device can process the image.

3. The method of claim 1, further comprising:
wherein the image comprises a plurality of sub-images;
wherein the first header identifies one or more of the plurality of sub-images for which signatures are to be generated;
generating a signature for each of the one or more identified sub-images based upon the key; and
adding a header to each of the one or more identified sub-images, wherein each header comprises the signature generated for the associated sub-image.

4. The method of claim 1, further comprising:
wherein the image comprising the second header is output to storage;
receiving a request for the image comprising the second header from the receiving device; and
outputting the image comprising the second header from storage to the receiving device.

5. The method of claim 1, further comprising:
wherein the image comprising the second header comprises an update to a previous embodiment of the image;
wherein the image comprising the second header is output to storage; and
if the receiving device has not previously received the update to the previous embodiment of the image, outputting the image comprising the second header from storage to the receiving device.

6. The method of claim 1, wherein the key associated with the receiving device is determined by identifying the key from a table, the table comprising one or more associations between devices and keys.

7. An apparatus comprising:
an interface configured to be used to receive an image from a signing client, wherein the image comprises a first header that is generated by the signing client, wherein the first header comprises an identification of a receiving device and an identification of one or more signatures and one or more encoding algorithms associated with the receiving device, wherein the one or more signatures and one or more encoding algorithms comprise one or more signatures and one or more encoding algorithms that are required for processing the image by a device type that is associated with the receiving device, wherein the signing client determines a device type that is associated with the receiving device based upon the identification of the receiving device, and wherein the one or more signatures and one or more encoding algorithms associated with the receiving device are determined by the signing client based upon an entry within a table that comprises an association between the device type associated with the receiving device and the one or more signatures and one or more encoding algorithms associated with the receiving device;
one or more modules configured to:
based on the information within the first header, determine a key and encoding algorithm associated with the receiving device;
retrieve the one or more signatures identified within the first header;
remove the first header from the received image;
encode the received image according to the key and encoding algorithm;
add a second header to the image, wherein the second header comprises the one or more signatures; and
an interface configured to be used to output the image comprising the second header to the receiving device.

8. The apparatus of claim 7, wherein the one or more identified signatures comprise one or more signatures required by the receiving device before the receiving device can process the image.

9. The apparatus of claim 7, wherein the image comprises a plurality of sub-images and the first header identifies one or more of the plurality of sub-images for which signatures are to be generated, and the one or more modules are further configured to:
generate a signature for each of the one or more identified sub-images based upon the key; and
add a header to each of the one or more identified sub-images, wherein each header comprises the signature generated for the associated sub-image.

10. The apparatus of claim 7, further comprising:
an interface configured to be used to output the image comprising the second header to storage;
wherein, upon receiving a request for the image comprising the second header from the receiving device, the image comprising the second header is output from storage to the receiving device.

11. The apparatus of claim 7, further comprising:
storage configured to store a table comprising one or more associations between devices and keys;
wherein the key associated with the receiving device is determined by identifying the receiving device and associated key from the table.

12. One or more non-transitory computer readable media having instructions operable to cause one or more processors to perform the operations comprising:
receiving, at a signing server, an image from a signing client, wherein the image comprises a first header that is generated by the signing client, wherein the first header comprises an identification of a receiving device and an identification of one or more signatures and one or more encoding algorithms associated with the receiving device, wherein the one or more signatures and one or more encoding algorithms comprise one or more signatures and one or more encoding algorithms that are required for processing the image by a device type that is associated with the receiving device, wherein the signing client determines a device type that is associated with the receiving device based upon the identification of the receiving device, and wherein the one or more signatures and one or more encoding algorithms associated with the receiving device are determined by the signing client based upon an entry within a table that comprises an association between the device type associated with the receiving device and the one or more signatures and one or more encoding algorithms associated with the receiving device;
based on the information within the first header, determining, at the signing server, a key and encoding algorithm associated with the receiving device;
retrieving the one or more signatures identified within the first header;
removing the first header from the received image;
encoding the received image according to the key and encoding algorithm;
adding a second header to the image, wherein the second header comprises the one or more signatures; and
outputting the image comprising the second header to the receiving device.

13. The one or more non-transitory computer-readable media of claim 12, wherein the one or more identified signatures comprise signatures required by the receiving device before the receiving device can process the image.

14. The one or more non-transitory computer-readable media of claim 12, wherein the instructions are further operable to cause one or more processors to perform the operations comprising:
   wherein the image comprises a plurality of sub-images;
   wherein the first header identifies one or more of the plurality of sub-images for which signatures are to be generated;
   generating a signature for each of the one or more identified sub-images based upon the key; and
   adding a header to each of the one or more identified sub-images, wherein each header comprises the signature generated for the associated sub-image.

15. The one or more non-transitory computer-readable media of claim 12, wherein the instructions are further operable to cause one or more processors to perform the operations comprising:
   wherein the image comprising the second header is output to storage;
   receiving a request for the image comprising the second header from the receiving device; and
   outputting the image comprising the second header from storage to the receiving device.

16. The one or more non-transitory computer-readable media of claim 12, wherein the instructions are further operable to cause one or more processors to perform the operations comprising:
   wherein the image comprising the second header comprises an update to a previous embodiment of the image;
   wherein the image comprising the second header is output to storage; and
   if the receiving device has not previously received the update to the previous embodiment of the image, outputting the image comprising the second header from storage to the receiving device.

17. The one or more non-transitory computer-readable media of claim 12, wherein the key associated with the receiving device is determined by identifying the key from a table, the table comprising one or more associations between devices and keys.

* * * * *